United States Patent [19]

Burnham

[11] Patent Number: 5,135,664

[45] Date of Patent: Aug. 4, 1992

[54] METHOD FOR TREATING WASTEWATER SLUDGE

[75] Inventor: Jeffrey C. Burnham, Maumee, Ohio

[73] Assignee: N-Viro Energy Systems Ltd., Toledo, Ohio

[21] Appl. No.: 621,221

[22] Filed: Nov. 30, 1990

[51] Int. Cl.[5] .............................................. C02F 11/14
[52] U.S. Cl. ........................................ 210/751; 71/12; 71/901; 210/764; 210/771; 210/916
[58] Field of Search ............... 210/609, 710, 751, 768, 210/770, 771, 901, 764, 916, 766; 71/12, 13, 901, 902

[56] References Cited

U.S. PATENT DOCUMENTS

| | | | |
|---|---|---|---|
| 2,026,969 | 1/1936 | Flynn | 210/769 |
| 3,345,288 | 10/1967 | Sontheimer | 210/609 |
| 3,756,784 | 9/1973 | Pittwood | 71/901 |
| 4,781,842 | 11/1988 | Nicholson | 210/751 |
| 4,793,927 | 12/1988 | Meehan et al. | 210/764 |
| 4,902,431 | 2/1990 | Nicholson et al. | 210/916 |
| 4,997,572 | 3/1991 | Wurtz | 210/710 |

Primary Examiner—Peter Hruskoci
Attorney, Agent, or Firm—Barnes, Kisselle, Raisch, Choate, Whittemore & Hulbert

[57] ABSTRACT

A method for treating wastewater sludge which comprises the steps of further treating the sludges after they have been mixed with alkaline materials and are still in a wet condition with carbon dioxide containing gases wherein the carbon dioxide is a significant constituent for a time sufficient to reduce the pH below 10 and to prevent the emission of the ammonia nitrogen. Preferably heat is added to the mixture to accelerate the reaction and facilitate drying. The product is useful as an agricultural product. In a preferred process, the amount of alkaline materials being sufficient to raise the pH of the mixture to 12 or above and to heat the mixture by an exothermic reaction to a range of about 52° C. to about 62° C. and maintain the pH above 12 and the temperature range for a minimum of 12 hours to reduce significantly offensive odor of the sludge to a level that is tolerable; to reduce anumal viruses therein to less than one plaque forming unit per 5 grams dry weight of said sludge; to reduce pathogenic bacteria therein no less than three colony forming units per 5 grams dry weight of said sludge; to reduce parasites therein to less than one viable egg per 5 grams dry weight of said sludge; to retain a soil-like indigenous microflora; to reduce vector attraction to said sludge; and to prevent significant regrowth of the pathogenic microorganism; and thereafter subjecting the mixture to carbon dioxide containing gas wherein carbon dioxide is a significant constituent for a time sufficient to reduce the pH below 10 and to prevent the emission of the ammonia nitrogen.

12 Claims, 6 Drawing Sheets

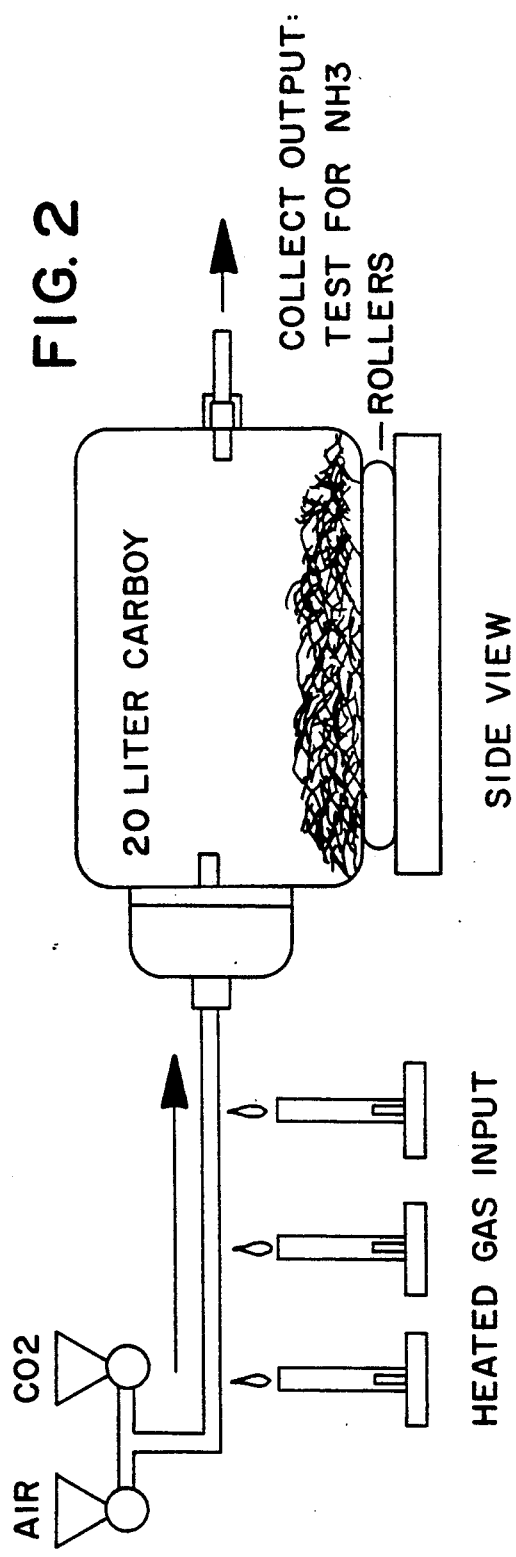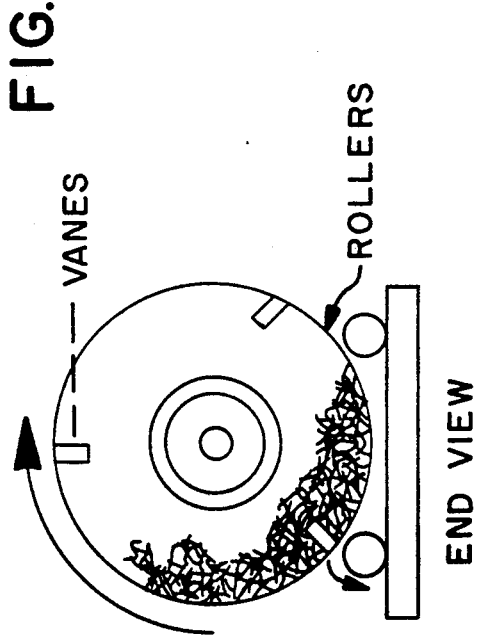

METHOD FOR TREATING WASTEWATER SLUDGE

This invention relates to a method of treating waste water sludge designed to detoxify the sludge so that it can be safely applied as fertilizer in agricultural.

BACKGROUND OF THE INVENTION

The United States Environmental Protection Agency (EPA) has promulgated rules governing the type of processes that can be used to treat wastewater sludge.

Under 40 CFR 257, a Process to Further Reduce Pathogens (PFRP) must be used where sewage sludge or septic tank pumping are to be applied to a land surface or are incorporated into the soil, and crops for direct human consumption are to be grown on such land within eighteen (18) months subsequent to application or incorporation.

A Process to Significantly Reduce Pathogens (PSRP) must be used where sewage sludge or septic tank pumping are to be applied to a land surface or incorporated into the soil and the public will have access to such land within twelve (12) months subsequent to application or incorporation, or grazing animals, whose products are consumed by humans, will have access to such land within one (1) month subsequent to application or incorporation.

Appendix II or 40 CFR 257 classifies the following as PSRP and PFRP processes:

A. Processes to Significantly Reduce Pathogens

Aerobic digestion: The process is conducted by agitating sludge with air or oxygen to maintain aerobic conditions at residence times ranging from 60 days at 15° C. to 40 days at 20° C., with a volatile solids reduction of at least 38 percent.

Air Drying: Liquid sludge is allowed to drain and/or dry on under-drained sand beds, or paved or unpaved basins in which the sludge is at a depth of nine inches. A minimum of three months is needed, two months of which temperatures average on a daily basis above 0° C.

Anaerobic digestion: The process is conducted in the absence of air at residence times ranging from 60 days at 20° C. to 15 days at 35° C. to 55° C., with a volatile solids reduction of at least 38 percent.

Composting: Using the within-vessel, static aerated pile or windrow composting methods, the solid waste is maintained at minimum operating conditions of 40° C. for 5 days. For four hours during this period the temperature exceeds 55° C.

Lime Stabilization: Sufficient lime is added to reduce a pH or 12 after 2 hours of contact.

Other methods: Other methods or operating conditions may be acceptable if pathogens and vector attraction of the waste (volatile solids) are reduced to an extent equivalent to the reduction achieved by any of the above methods.

B. Process to Further Reduce Pathogens

Composting: Using the within-vessel compositing method, the solid waste is maintained at operating conditions of 55° C. or greater for three days. Using the static aerated pile composting method, the solid waste is maintained at operating conditions of 55° C. or greater for three days. Using the windrow composting method, the solid waste attains a temperature of 55° C. or greater for at least 15 days during the composting period. Also, during the high temperature period, there will be a minimum of five turnings of the windrow.

Heating drying: Dewatered sludge cake is dried by direct or indirect contact with hot gases, and moisture content is reduced to 10 percent or lower. Sludge particles reach temperatures well in excess of 80° C. or wet bulb temperature of the gas stream in contact with the sludge at the point where it leaves the dryer is in excess of 80° C.

Heat treatment: Liquid sludge is heated to temperatures of 180° C. for 30 minutes.

Thermophilic Aerobic Digestion: Liquid sludge is agitated with air or oxygen to maintain aerobic conditions at residence times of 10 days at 55°-60° C., with a volatile solids reduction of at least 38 percent.

Other methods: Other methods of operating conditions may be acceptable if pathogens and vector attraction of the waste (volatile solids) are reduced to an extent equivalent to the reduction achieved by any of the above methods.

Any of the processes listed below, if added to the processes described in Section A above, further reduce pathogens. Because the processes listed below, on their own, do not reduce the attraction of disease vectors, they are only add-on in nature.

Beta ray irradiation: Sludge is irradiated with beta rays from an accelerator at dosages of at least 1.0 megarad at room temperature (ca. 20° C.).

Gamma ray irradiations: Sludge is irradiated with gamma rays from certain isotopes, such at 60 Cobalt and 137 Cesium, at dosages of at least 1.0 megarad at room temperature (ca. 20° C.).

Pasteurization: Sludge is maintained for at least 30 minutes at a minimum temperatures of 70° C.

Other methods: Other methods of operating conditions may be acceptable if pathogens are reduced to an extent equivalent to the reduction achieved by any of the above add-on methods.

In U.S. Pat. Nos. 4,781,842 and 4,902,431 there is disclosed processes wherein:

wastewater sludge containing odor, animal viruses, pathogenic bacteria, and parasites is treated to provide a fertilizer for agricultural lands which can be applied directly to the lands which consists essentially of the following steps:

mixing said sludge with at least one material selected from the group consisting of lime, cement kiln dust and lime kiln dust to form a mixture, wherein the amount of added material mixed with said sludge being sufficient to raise the pH of said mixture to 12 and above for at least one day;

and drying said mixture to produce a granular material, the amount of added material mixed with said sludge and the length of time of drying being sufficient to reduce significantly offensive odor of the sludge to a level that is tolerable; to reduce animal viruses therein to less than one plaque forming unit per 100 ml of said sludge; to reduce pathogenic bacteria therein no less than three colony forming units per 100 ml of said sludge; to reduce parasites therein to less than one viable egg per 100 ml of said sludge; to reduce vector attraction to said sludge; and to prevent significant regrowth of the pathogenic microorganisms.

In these processes, the alkaline material may comprise lime, cement kiln dust or lime kiln dust or other alkaline materials.

Other processes for treating wastewater sludge have utilized the concept of raising the pH in combination with high heat, e.g., greater than 70° C., to sterilize as contrasted to pasteurizing the sludge thereby killing all of the bacteria both undesirable and desirable.

When alkaline materials are added to raise the pH, a toxicity exists due to the high pH. When the product is used as a soil supplement in agriculture, particularly at high application rates, there is a risk of over alkalinization of the soil and burning of crops may result.

In addition, the high pH triggers the release of volatile ammonia nitrogen from the sludge which also is toxic and results in the loss of valuable nitrogen from the potential agricultural product. Further, the toxic nature of ammonia, i.e., to human and animal mucus membranes has been described as well as its lethal activity on microorganisms (see Meehan et al 1988 U.S. Pat. No. 4,793,927). Although having ammonia present during sludge stabilization processing is highly desirable for microbial control, it is not desirable following treatment when the sludge product usage and exposure to the public is likely.

If these toxic stresses could be reduced upon demand, then opportunities for alkaline sludge utilization by the public and private sector would increase. This result would be favorable to increased emphasis on resource recovery of the value inherent in municipal sludge material.

All the aforementioned processes for treating waste sludge with alkaline materials by converting a waste to a usable community acceptable product require significant time and space.

In addition, time and space are also important process considerations in determining the use of sludges in various markets.

Among the objectives of the present invention are to provide a method of treating wastewater sludge wherein the toxicity due to pH is rapidly reduced; wherein the release of ammonia nitrogen is inhibited; wherein the resultant product retains the ammonia nitrogen for its beneficial use as an agricultural component of the product; wherein a usable agricultural product is achieved in substantially less time; and wherein the product has soil-like physical characteristics, as opposed to pelletization, so that optimum drying and community acceptable odor control are achieved under conditions that, in the preferred embodiment, allow the survival of indigenous microflora.

SUMMARY OF THE INVENTION

In accordance with the invention, the process comprises the steps of further treating the sludges after they have been mixed with alkaline materials and are still in a wet condition with carbon dioxide containing gases wherein the carbon dioxide is a significant constituent for a time sufficient to reduce the pH below 10 and to prevent the emission of the ammonia nitrogen. Preferably heat is added to the mixture to accelerate the reaction and facilitate drying. The product is useful as an agricultural product. In a preferred process, the amount of alkaline materials being sufficient to raise the pH of the mixture to 12 or above and to heat the mixture by an exothermic reaction to a range of about 52° C. to about 62° C. and maintain the pH at above 12 and the temperature range for a minimum of 12 hours to reduce significantly offensive odor of the sludge to a level that is tolerable; to reduce animal viruses therein to less than one plaque forming unit per 5 grams dry weight of said sludge; to reduce pathogenic bacteria therein no less than three colony forming units per 5 grams dry weight of said sludge; to reduce parasites therein to less than one viable egg per 5 grams dry weight of said sludge; to retain a soil-like indigenous microflora; to reduce vector attraction to said sludge; and to prevent significant regrowth of the pathogenic microorganisms; and thereafter subjecting the mixture to carbon dioxide containing gas wherein carbon dioxide is a significant constituent for a time sufficient to reduce the pH below 10 and to prevent the emission of the ammonia nitrogen.

DESCRIPTION OF THE DRAWINGS

FIG. 2 is a schematic diagram of a drum (on mechanical rollers) alkaline treated showing in which alkaline treated sludge is exposed to heated or unheated carbon dioxide or air.

FIG. 3 is the end view of the drum shown in FIG. 2.

DESCRIPTION

Figure 1:
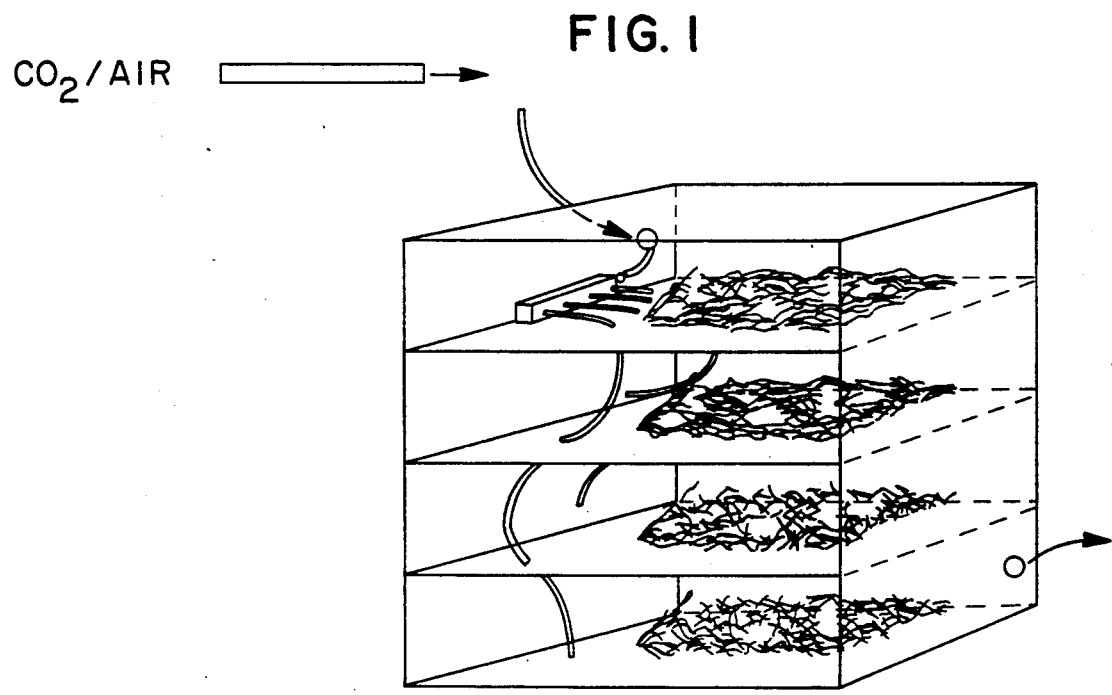
FIG. 1 is a schematic diagram of a multilayered chamber in which sludge is exposed to heated or unheated carbon dioxide or air.
Figure 4:
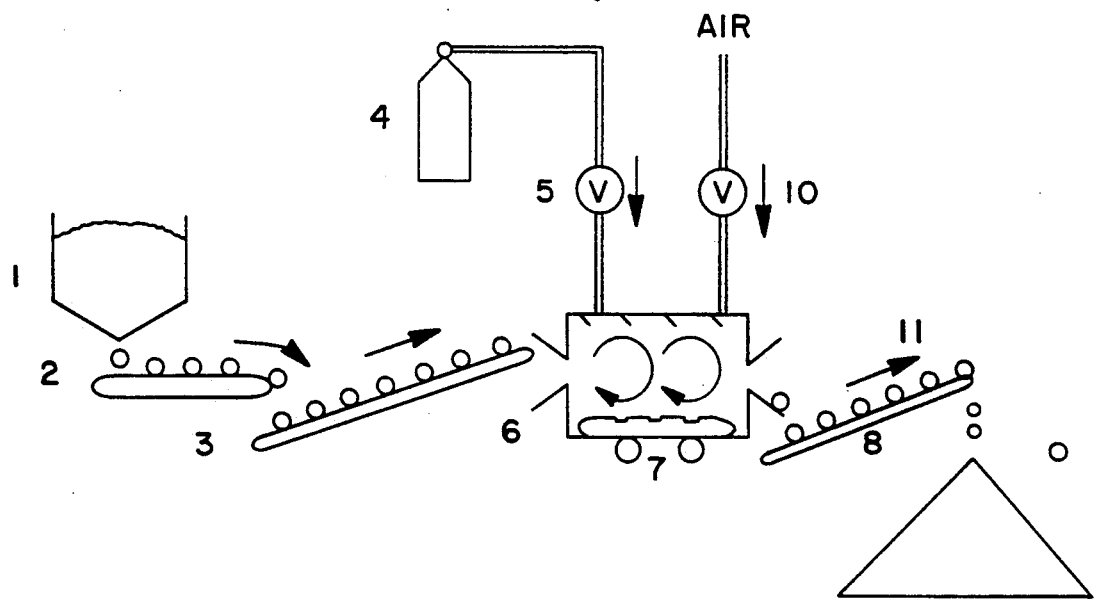
FIG. 4 is a schematic diagram can be used in conjunction with a full scale alkaline stabilization operation.

In accordance with the invention, the method of treating wastewater sludge comprises the following steps:

mixing the sludge with alkaline materials to form a mixture wherein the amount of added materials mixed with said sludge are sufficient to raise the pH of the mixture to 12 and above for at least two hours; and then subjecting the mixture of sludge and alkaline material to carbon dioxide containing gas wherein the carbon dioxide is a significant constituent for a time sufficient to reduce the pH below 10 and to prevent the emission of the ammonia nitrogen.

As is well known in the art, the alkaline materials may comprise lime, cement kiln dust, lime kiln dust, fluidized bed ash, fly ash and alkaline gypsum.

The carbon dioxide containing gas may be selected from the group consisting of carbon dioxide gas, flue gas or emission gases resulting from the combustion of methane or other organic materials wherein the carbon dioxide is a significant constituent of the flue gas, or emission gases.

Preferably the amount of carbon dioxide is at least 10 times the concentration of carbon dioxide in the atmosphere by weight.

It is preferred that the mixture be heated by heating the carbon dioxide containing gas or the sludge or both. In one method, the mixture and sludge and alkaline materials are subject to the carbon dioxide until the pH is below 10 and the emission of ammonia nitrogen is prevented and thereafter, if necessary, the mixture is subjected to an air pulse to dry the product. The apparatus utilized for subjecting the mixture to carbon dioxide containing gas may comprise a multilayered chamber such as shown schematically in FIG. 1 or a rotating drum such as shown schematically in FIGS. 2 and 3.

The amount of carbon dioxide in the carbon dioxide containing gas preferably should be at least 10 times the concentration of carbon dioxide in the atmosphere by weight.

In a preferred form of the invention, the wastewater sludge comprising biological sludge is first treated in accordance with the processes of U.S. Pat. Nos. 4,781,842 and 4,902,431, incorporated herein by reference, such that the process comprises the following steps:

mixing the sludge with at least one alkaline material;

the amount of alkaline materials being sufficient to raise the pH of the mixture to 12 or above and to heat the mixture by an exothermic reaction to a range of about 52° C. to about 62° C. and maintain the pH at above 12 and the temperature range for a minimum of 12 hours to reduce significantly offensive odor of the sludge to a level that is tolerable; to reduce animal viruses therein to less than one plaque forming unit per 5 grams dry weight of said sludge, to reduce pathogenic bacteria therein no less than three colony forming units per 5 grams dry weight of said sludge; to reduce parasites therein to less than one viable egg per 5 grams dry weight of said sludge to retain a soil-like indigenous microflora; to reduce vector attraction to said sludge; and to prevent significant regrowth of the pathogenic microorganisms; and thereafter subjecting the mixture to carbon dioxide containing gas wherein carbon dioxide is a significant constituent for a time sufficient to reduce the pH below 10 and to prevent the emission of the ammonia nitrogen.

In accordance with the preferred process, a pasteurized agricultural product is achieved which is not toxic and can be readily applied and results in a method of treating wastewater sludge wherein the toxicity due to pH is rapidly reduced; wherein the release of ammonia nitrogen is inhibited; wherein the resultant product retains the ammonia nitrogen for its beneficial use as an agricultural component of the product; wherein a usable agricultural product is achieved in substantially less time; and wherein the product has soil-like physical characteristics, as opposed to pelletization, so that optimum drying and community acceptable odor control are achieved under conditions that allow the survival of indigenous microflora.

The following examples relate to tests conducted in accordance with the above-described preferred process.

EXAMPLE I

Figure 5:
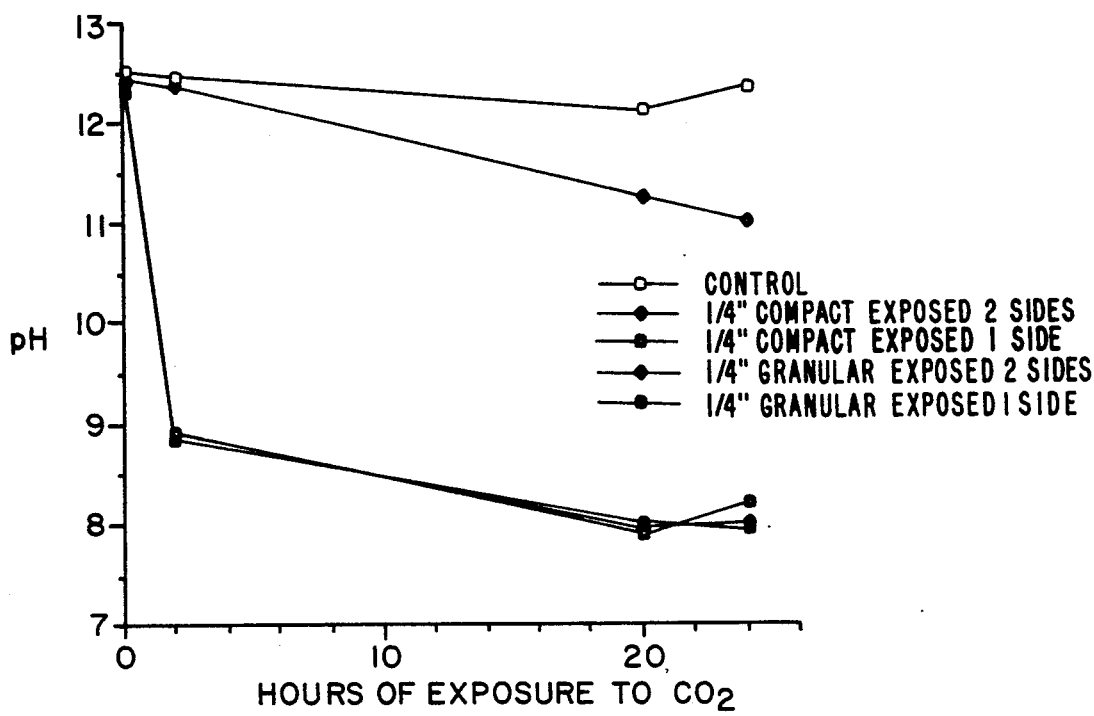
FIG. 5 are curves showing the effect of carbon dioxide on the pH of thin layered ($\frac{1}{4}$") alkaline treated sludge exposed in a multilayered chamber.
Figure 6:
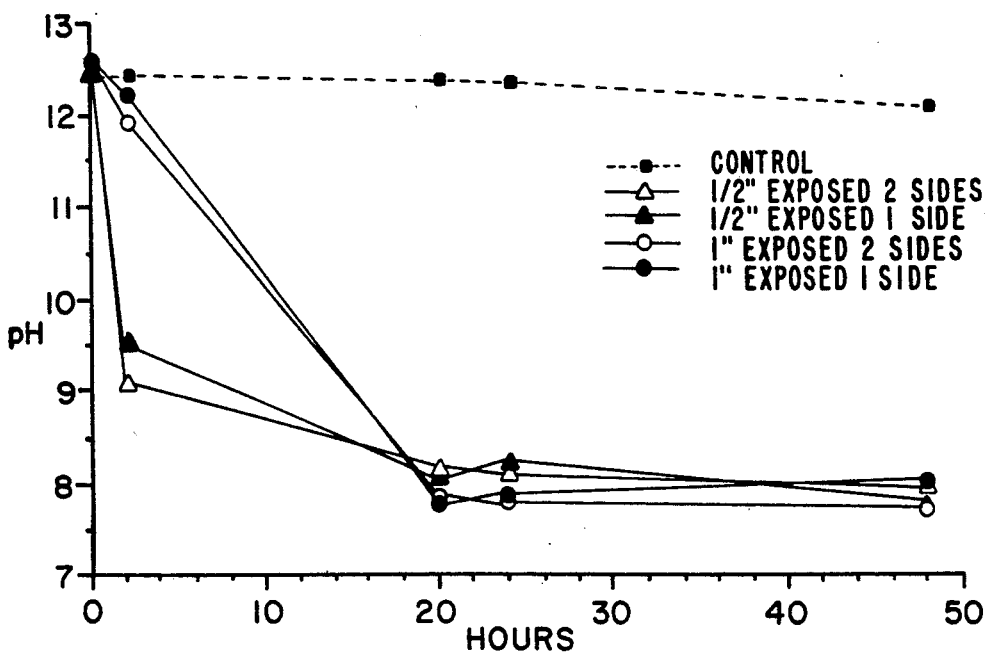
FIG. 6 are curves showing the effect of carbon dioxide on the pH of thin layered ($\frac{1}{2}$ & 1") alkaline treated sludge exposed in a multilayered chamber.
Figure 7:
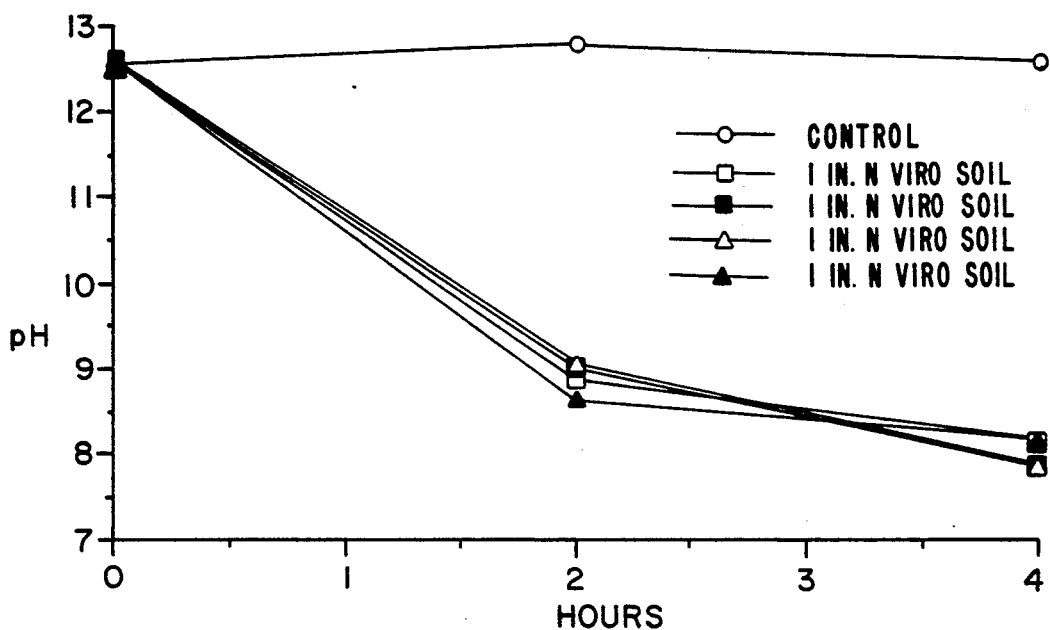
FIG. 7 are curves showing the consistency of pH reduction of alkaline treated sludge in the multilayered chamber.

In a test utilizing a multilayered incubator such as shown diagrammatically in FIG. 1, the wet alkaline mixture of wastewater sludge and alkaline materials was exposed to carbon dioxide gas and air. The pH reduction results obtained with this chamber indicate that thin layers of granular treated sludge will rapidly reach a pH of about 9 (see FIGS. 5, 6, 7—note that control alkaline treated materials made in accordance with the processes of the aforementioned U.S. Pat. Nos. 4,781,842 and 4,902,431 were held in a windrow configuration for the same length of time).

EXAMPLE II

Figure 8:
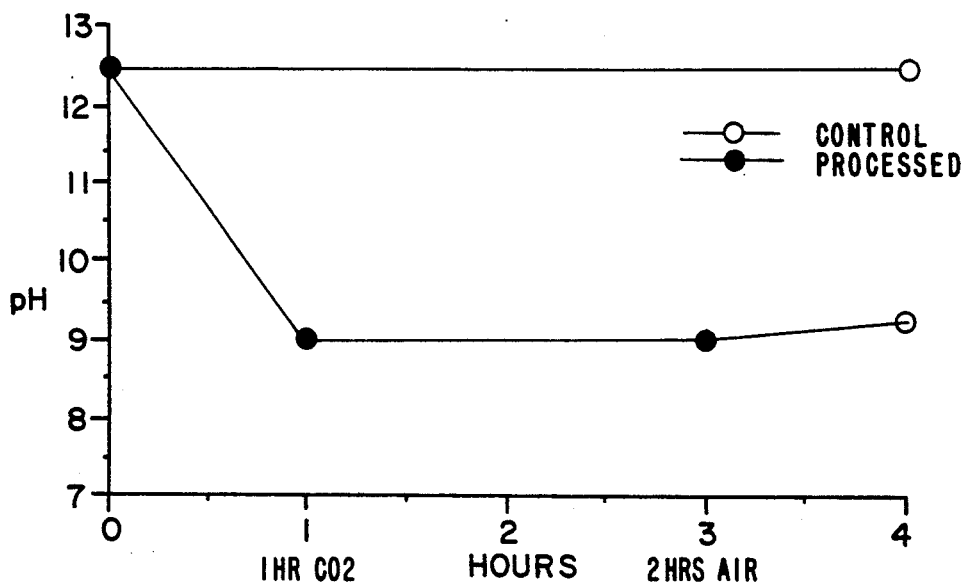
FIG. 8 are curves showing the reduction in pH that occurred in alkaline treated sludge in a rotary drum chamber into which warmed carbon dioxide gas was passed.
Figure 10:
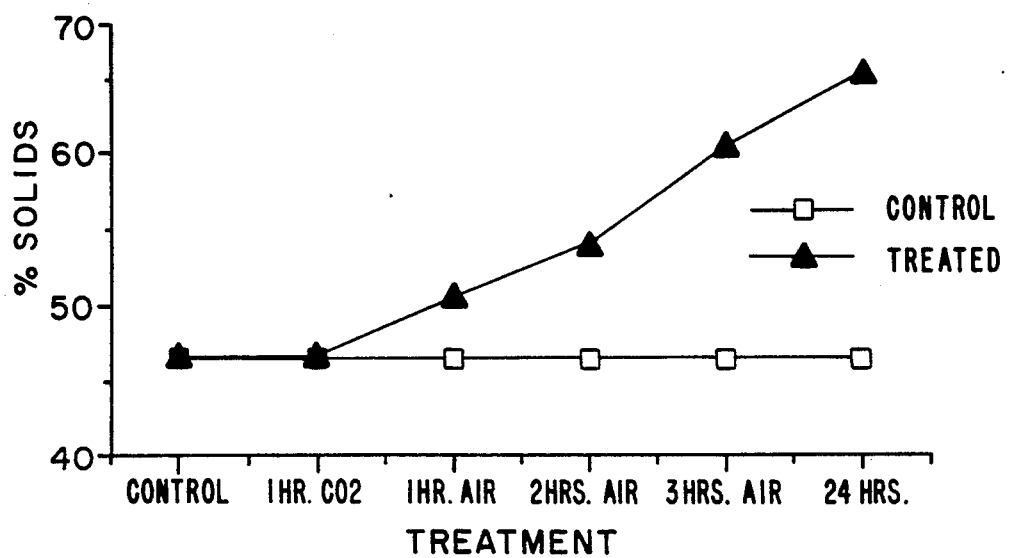
FIG. 10 are curves showing the increase in solids obtained by treating the alkaline treated sludge in a rotary drum chamber was principally due to the air introduced rather than the carbon dioxide.
Figure 9:
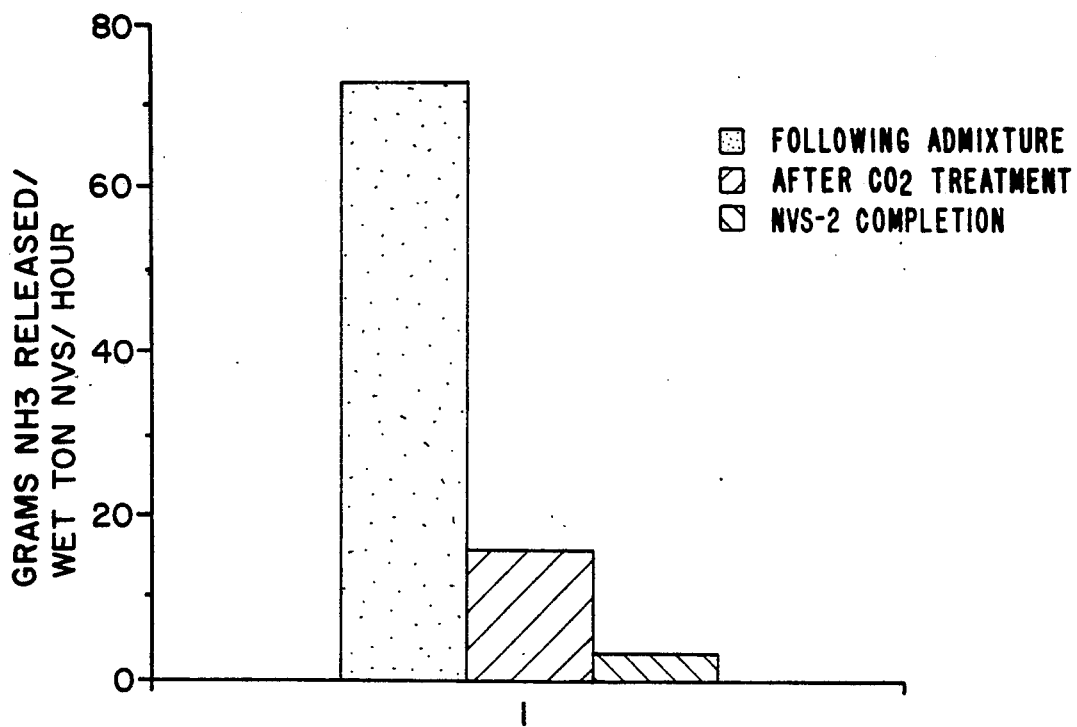
FIG. 9 is a chart showing the reduction in ammonia emission that occurred in the alkaline treated sludge product following carbon dioxide treatment in the rotary drum chamber.

In a second experiment, the carbon dioxide containing gas was heated, the gas being at a temperature of 70° C. and the sludge temperature never exceeding 62° C. with mechanical processors such as shown schematically in FIG. 2. The rotating drum processor provided continuous mechanical agitation and produced a product after one hour of exposure to carbon dioxide containing gas and two hours of high velocity air. A lower of the pH from over 13 to 9 (FIG. 8). This pH was sufficient to block discharge of ammonia from the alkaline treated anaerobically digested sludge (FIG. 9) and very little ammonia was detectable after the result. A corresponding increase in the percent solids of the processed product was also measured (FIG. 10). Almost all of these results suggested that the carbon dioxide containing gas phase of the method when at ambient temperatures or no higher than 70° C. caused little drying as compared to that of the air input phase (FIG. 10). As a result of these experiments, it was determined that two to three hours of processing could replace up to 10 days of windrowing which is utilized in the aforementioned processes of U.S. Pat. Nos. 4,781,842 and 4,902,431 to reduce the pH to non-toxic levels and reduce the amounts of ammonia nitrogen emission to acceptable levels and reduce product odor to community acceptable levels while increasing the percent solids and stability of the treated sludge product.

I claim:

1. In the method of treating wastewater sludges with alkaline materials wherein the method comprises the steps of mixing said sludge with alkaline materials to form a mixture wherein the amount of added materials mixed with said sludge are sufficient to raise the pH of said mixture to 12 and above for at least two hours and sufficient to emit ammonia nitrogen from said sludge;

the improvement comprising, thereafter subjecting the mixture of sludge and alkaline material to carbon dioxide containing gas for a time sufficient to reduce the pH below 10 and to prevent the emission nitrogen from said sludge.

2. The method set forth in claim 1 wherein said carbon dioxide containing gas is selected from the group consisting of carbon dioxide gas, flue gas or emission gases resulting from the combustion of methane or other organic materials wherein the carbon dioxide is a significant constituent of said flue gas, or emission gases.

3. The method set forth in claim 2 wherein the amount of carbon dioxide is at least 10 times the concentration of carbon dioxide in the atmosphere by weight.

4. The method set forth in claim 1 including the step of heating the carbon dioxide containing gas.

5. The method set forth in claim 1 including the step of heating the sludge.

6. The method set forth in claim 1 including the step of heating the gas and sludge.

7. The method set forth in claim 1 wherein said carbon dioxide containing gas comprises a mixture of carbon dioxide and air.

8. The method set forth in claim 1 wherein said mixture is subjected to air to dry the mixture.

9. The method set forth in claim 1 wherein during the step of treating, the alkaline treated sludge is moved through a multilayered chamber during the treatment with carbon dioxide containing gas.

10. The method set forth in claim 1 wherein said alkaline mixture is rotated in a drum along a horizontal axis during the time that the sludge is treated with carbon dioxide containing gas.

11. The method set forth in claim 1 wherein said alkaline material comprises at least one material selected from the group consisting of lime, cement kiln dust, lime kiln dust and fluidized bed ash to form a mixture.

12. The method set forth in any one of claims 1-11 including the amount of alkaline material being such as to raise the pH of the mixture to 12 or above and to heat the mixture by an exothermic reaction to a range of about 52° C. to about 62° C. and maintain the pH at above 12 and the temperature at said range for a minimum of 12 hours to reduce significantly offensive odor of the sludge to a level that is tolerable; to reduce animal viruses therein to less than one plaque forming unit per 5 grams dry weight of said sludge; to reduce pathogenic bacteria therein no less than three colony forming units per 5 grams dry weight of said sludge; to reduce parasites therein to less than one viable egg per 5 grams dry weight of said sludge; to retain a soil-like indigenous microflora; to reduce vector attraction to said sludge; and to prevent significant regrowth of the pathogenic microorganisms.

* * * * *